Patented Jan. 23, 1923.

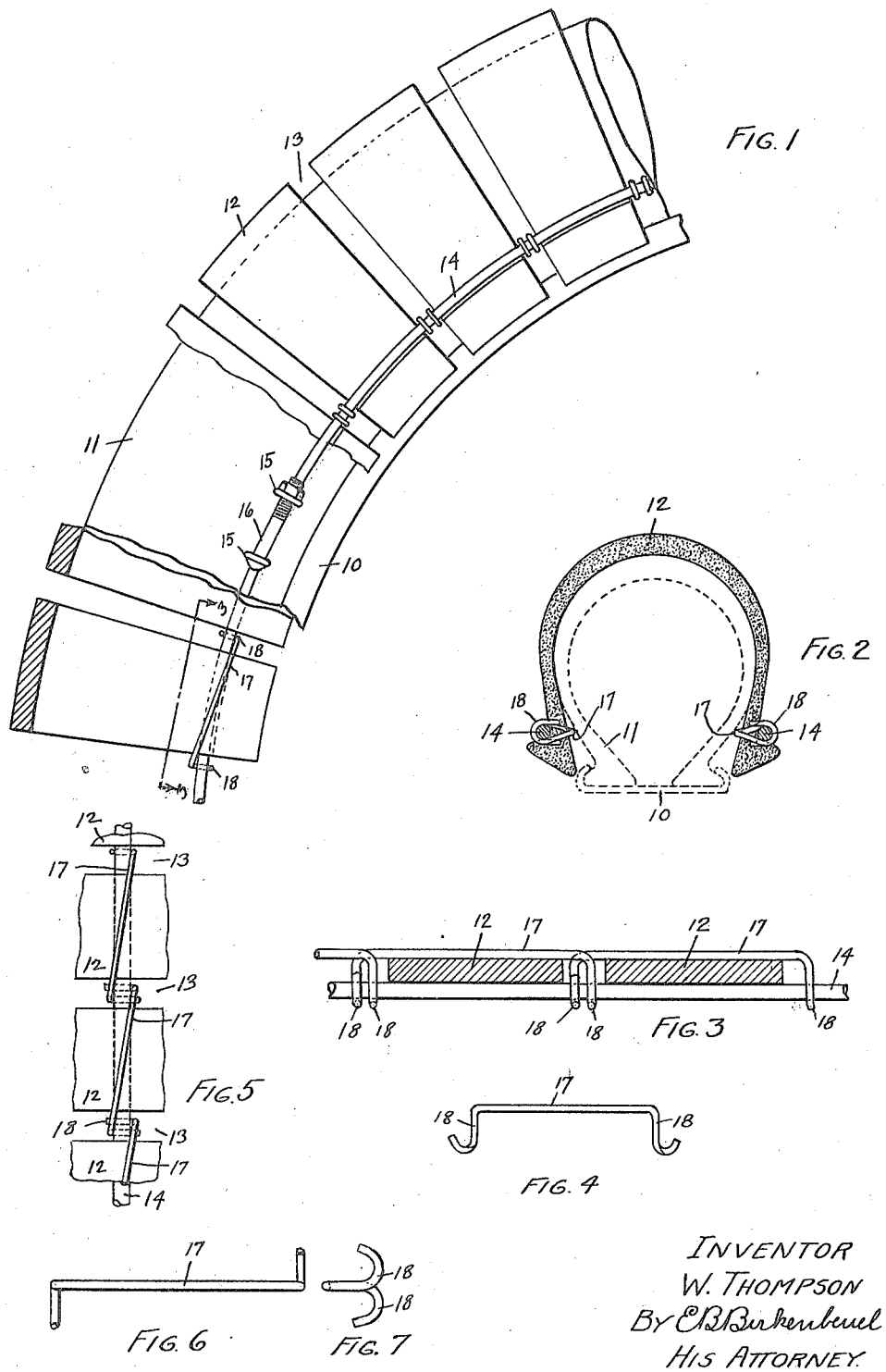

1,443,059

UNITED STATES PATENT OFFICE.

WILLIAM THOMPSON, OF PORTLAND, OREGON, ASSIGNOR, BY DIRECT AND MESNE ASSIGNMENTS, OF ONE-THIRD TO FLOYD H. BEAMAN, ONE-THIRD TO OLAF A. UTHAUG, AND ONE-THIRD TO FRANK C. HENDRICK, ALL OF PORTLAND, OREGON.

TIRE GUARD.

Application filed February 4, 1922. Serial No. 534,234.

*To all whom it may concern:*

Be it hereby known that I, WILLIAM THOMPSON, a citizen of the United States, and a resident of Portland, in the county of Multnomah and State of Oregon, have invented a new and useful Tire Guard, of which the following is a specification.

This invention relates more particularly to pneumatic tires.

The objects of my invention are to provide an exceedingly simple and efficient attachment for pneumatic tires which will protect the tire, reinforce it in weak places, give it better traction and reduce skidding.

Another object is to reduce the liability of punctures.

A further object is to so construct same that the various units may be separated at different distances if desired, and at the same time enable one to replace any single section without removing the others.

A still further object is the utilization of the good portions of defective tires in the protection of other tires.

I accomplish these results in the manner set forth in the following specification and illustrated in the accompanying drawing, in which:

Figure 1 illustrates a section of a tire a part of which is equipped with my device and also a section through one of the units from which the tire has been removed. Figure 2 is a section through the device between units and shows its relation to a tire and rim. Figure 3 is a section through 3—3 in Fig. 1. Figure 4 is a perspective of one of the clamps. Figure 5 is a view of the clamps from the inside of the device. Figure 6 is a plan of the clamp of which Figure 7 is an elevation.

Similar numbers of reference refer to the same or similar parts throughout the several views.

Referring in detail to the drawing, I have illustrated a rim 10 on which the usual outer casing 11 is attached. This may be either clincher or straight side.

Referring more particularly to my device it will be seen that I have utilized a plurality of tire sections 12 which I have placed over the tire, leaving spaces 13 between same. On each side of these sections in the groove or bend which ordinarily engages the wheel rim 10 I have placed a wire ring 14 whose ends 15 are formed into eyes through which is passed a bolt 16 for adjusting purposes. Between the casing 11 and the ends of the section 12 I have placed the wires 17 whose ends 18 bend outwardly through the spaces 13. One end 18 passes below the wire 14 and bends upwardly around same and the other end 18 passes over the wire 14 and bends downwardly around same. In other words, the clamping wire 17 has right and left ends which naturally work in conjunction with adjacent clamps 17.

In Figure 5 I have somewhat exaggerated the relation of the clamps 17 in order to show the manner in which they hold the various sections 12 against the wire 14. It will be evident that the ends 18 can be bent in the same direction, in which case both ends of one clamp 17 would pass around the top of the wire 14 and both ends of the adjacent clamp 17 would pass around the bottom of the wire 14.

It will be also observed that I have illustrated the adjacent clamps as over-lapping or hooking into one another. This also can be dispensed with in certain cases, inasmuch as the strain of holding the various sections 12 in place upon the casing 11 must be taken care of by the wires 14, which, it will be seen, must be relatively strong, whereas the clamping wire 17 can be fairly light as they have only a small proportion of the load to carry; but they should be made from some ductile material in order to facilitate their application or removal.

It will be understood that in the practical application of this device it is desirable to utilize sections 12 cut from a tire or outer casing similar in size to the casing 11, although this is not absolutely necessary.

In driving over muddy or wet roadways greatly increased traction is secured and the tendency to puncture is greatly reduced, since the object which would ordinarily cause a puncture must either pierce through the extra thickness of the member 12 or be robbed of an equal amount of length in case it should attempt to pass through the casing 11 at one of the spaces 13, in which event it is more liable to be deflected by the casing itself on account of the space between the casing and the roadway.

In applying this device to a tire having one or more weak spots it can be so arranged that the sections 12 will cover these weak places, thereby reinforcing same greatly and adding to the length of life of a tire.

I am aware that numerous devices have been constructed purporting to utilize sections of worn tires for a similar purpose. I therefore do not claim my invention broadly but only within the limits set forth in the following claim.

What I claim is:

A protective armor for pneumatic tires consisting of a plurality of divided tire sections, in combination with a pair of closed rings adapted to lie against the outer sides of said tire sections above the beads of said sections when spaced around a tire and a plurality of clamp members adapted to hold each end of each tire section in spaced relation and against its wire rings, each of said clamps consisting of a piece of wire placed on the inside of a tire section behind said ring, the ends of said wire turning outwardly and hooking over said ring beyond the corresponding hook of the adjacent clamp in a manner that said adjacent hooks will overlap, said hooks being opened in a manner to permit the individual sections to be removed without moving any other portion of the armor except the clamps for that section.

WILLIAM THOMPSON.